United States Patent [19]
Contreras

[11] Patent Number: 4,582,167

[45] Date of Patent: Apr. 15, 1986

[54] ADJUSTABLE SAWHORSE

[76] Inventor: Albert Contreras, 2230 Prospect, National City, Calif. 92050

[21] Appl. No.: 768,198

[22] Filed: Aug. 22, 1985

[51] Int. Cl.[4] .......................................... F16M 11/00
[52] U.S. Cl. .................................. 182/181; 182/224
[58] Field of Search ............................ 182/181–186, 182/224–227, 178

[56] References Cited

U.S. PATENT DOCUMENTS

| | | | |
|---|---|---|---|
| 169,904 | 11/1875 | Hilliker | 182/181 |
| 1,454,881 | 5/1923 | Bryant | 182/181 |
| 1,542,952 | 6/1925 | Plass | 182/181 |
| 1,614,496 | 1/1927 | Scott | 182/181 |
| 2,744,795 | 5/1956 | McDonough | 182/183 |
| 3,272,284 | 9/1966 | Lincoln | 182/224 |
| 3,934,676 | 1/1976 | Rice | 182/183 |

FOREIGN PATENT DOCUMENTS

| | | | |
|---|---|---|---|
| 73210 | 10/1951 | Denmark | 182/224 |
| 1763 | of 1908 | United Kingdom | 182/183 |

*Primary Examiner*—Reinaldo P. Machado
*Attorney, Agent, or Firm*—Charmasson & Holz

[57] ABSTRACT

An adjustable sawhorse comprising two lateral supports joined by a cross beam. The cross beam functions as the back of the sawhorse, and has three sets of tensioning plates. Two of these sets are mounted on each side of the cross beam, and the third set is located in the center thereof. These plates strengthen the cross beam and enable it to carry a heavier load, and to resist a much higher torsional force than without them. The cross beam also comprises a pair of diagonal braces, which join the central plate to the side plates, and which improve the load capability of the cross beam.

7 Claims, 8 Drawing Figures

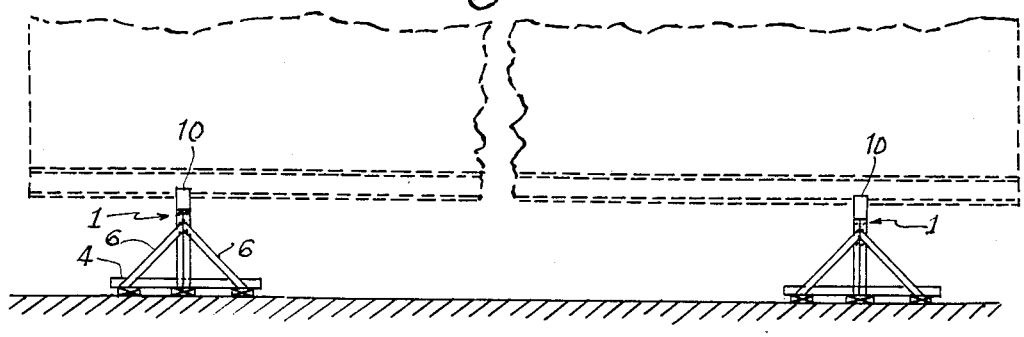
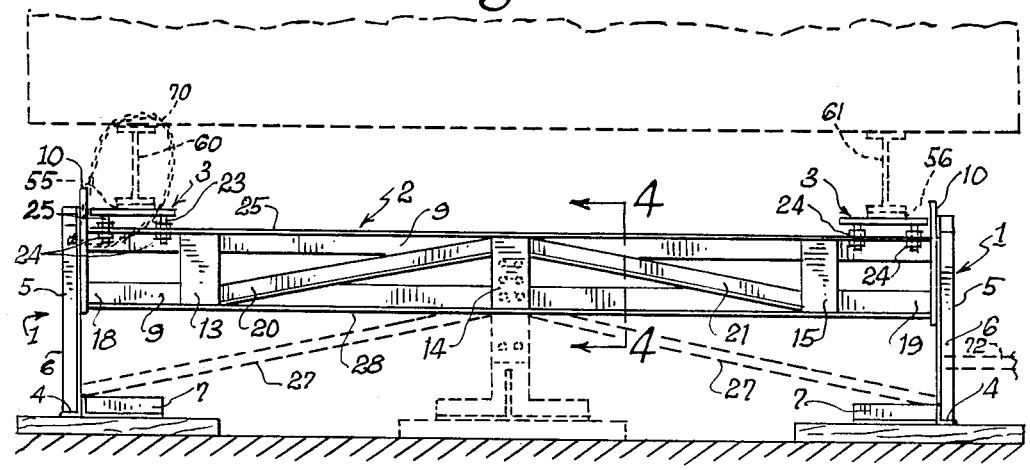
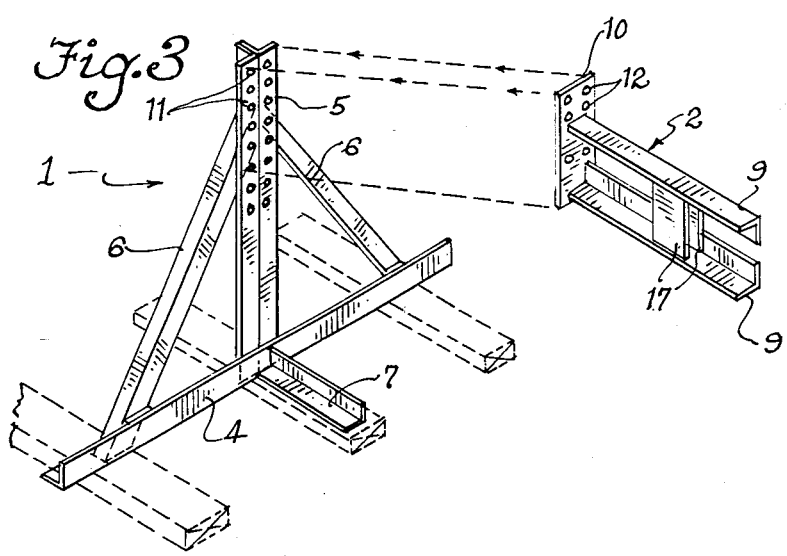
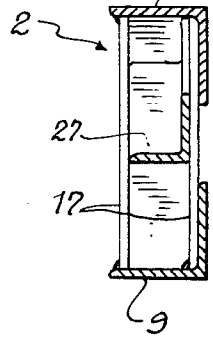

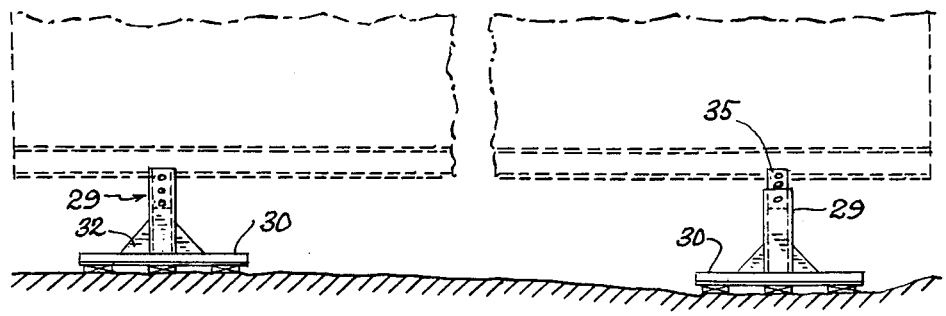
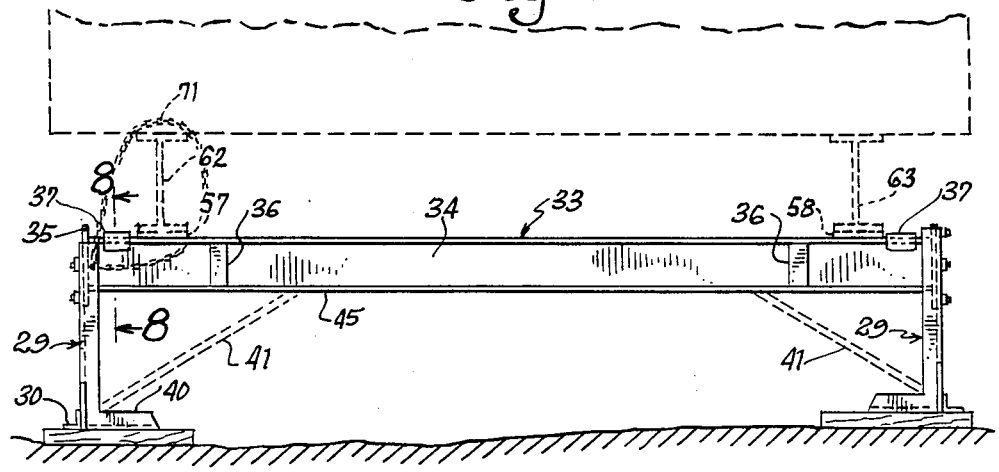
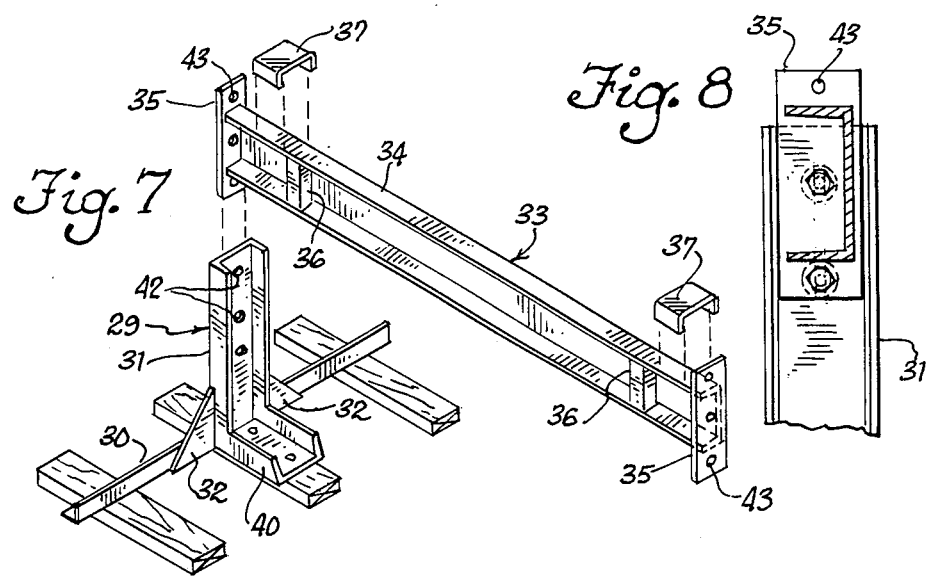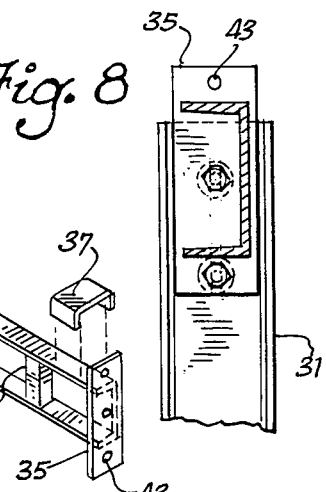

ADJUSTABLE SAWHORSE

FIELD OF THE INVENTION

The present invention relates to support structures, and more specifically, to adjustable sawhorses.

BACKGROUND OF THE INVENTION

In the past thirty years, well in excess of one hundred patents have been granted for variations on the sawhorse. Many of these patents have been focused on the addition of features which enhance the utility of the device, while others have been focused on methods for folding or collapsing the device.

The sawhorses of the prior art such as those marketed by GOLDEN STATE MOBILE HOME SERVICES, and which are used to support heavy structures, tend to lack lateral stability when a substantial force is applied to the side of the sawhorse. The horizontal component of such force would cause the sawhorse to bend sideways, thus forming a deviation angle with the vertical plane.

Even a small deviation from the vertical plane could prove to be detrimental to the stability of the structure, especially when the supported weight is heavy. In which case, the vertical weight of the structure exerts a distorting torque proportional to the sine of the deviation angle. Such distorting torque increases the deviation angle, which causes an increment in the distorting component of the applied torque, until the sawhorse and the supported structure collapse.

Another disadvantage of the existing devices is that they afford a very limited degree of adjustment. When the ground on which the sawhorses are to be installed is not perfectly leveled, the compensation is primitively made by placing wooden pads under the sawhorses.

Even though the cross beam between the lateral supports could provide coarse vertical adjustments, the beam could not deviate from the horizontal position for fear of causing an incremental torque which forces the collapse of the sawhorse, as described above.

Wherefore, the existing devices could not offer refined adjustments. In the event the soil movement (such as an earthquake) causes the cross beam to deviate from its horizontal position, while the sawhorses are supporting a heavy structure such as a mobile home, the homeowner has to have the mobile home lifted while he inserts the wooden pads under the sawhorses, in order to compensate for the soil movement. This would be inconviently achieved at a considerable expense.

There is thus a need to construct an improved sawhorse with greater strength, rigidity and stability, and with a more flexible and variable capacity for adjustment, than the existing sawhorse.

SUMMARY OF THE INVENTION

The primary purpose of the present invention is to provide a relatively lightweight and inexpensively manufactured sawhorse with great strength and lateral stability.

Another purpose of the invention is to provide adjustment features, which allow inexpensive, expedient and easy compensation, for deviations in the terrain of installation.

These and other objects are achieved by means of a sawhorse, made from lengths of angle iron, which comprises tensioning plates, diagonal braces, toes and a pair of adjustable platforms.

BRIEF DESCRIPTION OF THE DRAWINGS

FIG. 1 is a side view of the preferred embodiment of two sawhorses supporting a structure shown in dotted line;

FIG. 2 is a frontal view of the preferred embodiment of the sawhorse;

FIG. 3 is a perspective view of the preferred embodiment of one lateral support and section of the cross beam;

FIG. 4 is a cross-sectional view of the preferred embodiment of the cross beam taken along line 4—4 of FIG. 2;

FIG. 5 is a side view of the second embodiment of two sawhorses supporting a structure;

FIG. 6 is a frontal view of the second embodiment of the sawhorse;

FIG. 7 is a perspective view of the second embodiment of one lateral support and of the cross beam;

FIG. 8 is a cross sectional view of the second embodiment of one end of the cross beam taken along line 8—8 of FIG. 6.

DESCRIPTION OF THE PREFERRED EMBODIMENT OF THE INVENTION

Referring now to FIGS. 1 through 4, the sawhorse comprises a pair of identical lateral supports 1, a cross beam 2, and a pair of adjustable platforms 3.

Referring now to FIG. 3, each lateral support 1 is constructed from angle irons. Lateral support 1 comprises a horizontal elongated base member 4; a post 5 extending vertically from the center of the base member 4; a pair of buttresses 6 each obliquely joining the base member 4 to the post 5; and a toe 7, for lateral stability, extending horizontally from the middle of the base member 4. The post 5 has a series of holes 11 at the upper part thereof.

FIGS. 2 and 3 show the preferred embodiment of the cross beam 2. The cross beam 2 comprises two parallel bars 9 made of angle iron, joined together by means of two end-plates 10, welded to both ends of the bars 9. The end plates 10 have a series of holes 12 matching those holes 11 at the upper part of the post 5. The holes 11 and 12 are coupled by bolts, to adjustably secure the cross beam 2 to the lateral support 1.

Cross beam 2 also comprises three sets of tensioning plates 13, 14 and 15. Each set comprises two parallel plates 17 welded face to face but distally from each other to the upper and lower bars 9. Two sets of tensioning plates 13 and 15 are located at about one sixth of the total length of the bar 9 from its respective ends 18 and 19. A third set 14 is located at the center of the cross beam 2.

As shown in FIG. 2, a pair of braces 20 and 21 join the central set 14 to the other two sets of tensioning plates 13 and 15 respectively.

Such configuration of the cross beam 2 and such combination of its constituting elements, more than doubles the normal load capacity of the sawhorse.

Experiments have been conducted on the sawhorse to determine its load capacity with and without the three sets of tensioning plates 13, 14 and 15. The results conclusively indicate that the maximum force the cross beam 12 could support without the three sets 13, 14 and 15 is 272.16 kilograms (600 lbs.); whereas the maximum allowable force with these sets installed is 771.11 kilograms (1,700 lbs.).

In order to provide refined adjustments, two adjustable platforms 3 are secured to the upper side 25 of the cross beam 2, by means of the threaded fingers 23. The upper end of each finger 23 is affixed to the underside of the platform 3; while the lower end goes through the upper side 25 of the cross beam 2. The adjustment is procured by means of two nuts 24 threaded onto each finger 23 on each face of the upper side 25.

For additional strength, an optional support could be added to the above preferred embodiment of the sawhorse, as shown in dotted lines in FIG. 2.

This optional support comprises a central footing mounted under the cross beam 2, below the central set of plates 14. The optional support also comprises two shoulders 27 diagonally joining the underside 28 of the cross beam 2 to the lower end of the post 5.

Referring now to FIGS. 5 through 8, the second embodiment of the sawhorse as shown, comprises a pair of identical lateral supports 29, a cross beam 33, and a pair of stops 37.

Referring now to FIG. 7, each lateral support 29 is constructed from U-shaped and angle irons. Lateral support 29 comprises a horizontal elongated base member 30; a post 31 extending vertically from the center of the base member 30, a pair of ribs 32 each joining the base member 30 to the post 31; and a toe 40 made of U-shaped iron extending horizontally from the middle of the base member 30. The post 31 has a series of holes 42 at the top thereof.

FIGS. 6 and 7 show the second embodiment of the cross beams 33. The cross beam 33 comprises a U-shaped bar 34; a pair of end-plates 35 welded to both ends of the bar 34. The end plates 35 have a series of holes 43 matching those holes 42 at the upper end of the post 31. The holes 42 and 43 are coupled by bolts, to secure the cross beam 33 to the lateral support 29.

Cross beam 33 also comprises two tensioning shafts 36 of a generally rectangular section. The shafts 36 are located at about one sixth of the total length of the bar 34 from its respective ends.

The cross beams 33 also comprises a pair of stops 37, made of U-shaped irons, dorsally welded at each end of the bar 34 respectively on each side of the supported structure in order to prevent lateral sliding.

For additional strength and stability, an optional support could be added to the above second embodiment of the sawhorse, as shown in dotted lines in FIG. 6. This optional support comprises two shoulders 41 diagonally joining the underside 45 of the bar 34 to the lower end of the post 31.

Referring now to FIGS. 2 and 6, the preferred and second embodiments optionally include 20.32 cm (8 inches) thick rubber pads 55, 56, 57 and 58 between the I-beams 60, 61, 62 and 63 and the platforms 3 and the cross beams 33 respectively.

Another option would be to wrap one chain 70 around the I-beam 60 for the preferred embodiment and another chain 71 around I-beam 62 for the second embodiment. These two chains 70 and 71 loop back and are bolted down at their ends to the lateral supports 1 and 29 respectively.

Yet another option is to attach a connecting bar 72 to one lateral support 1, as shown in FIG 2, for connecting two identical lateral supports 1 back to back, thereby doubling the length of the sawhorse.

While the preferred and second embodiments of the invention have been described and modifications have been suggested, it should be understood that other embodiments could be devised based on the same principle of operation, which would remain within the spirit of the invention and scope of the appended claims.

What is claimed is:

1. An adjustable sawhorse comprising:
   (A) a pair of identical lateral supports each having a footing which comprises:
      (1) a horizontal elongated base member;
      (2) a post extending vertically from the center of said base member; and
      (3) a pair of buttresses each obliquely joining one end of the base member to the upper part of the post.
   (B) a cross beam comprising:
      (1) a pair of parallel bars distally joined above each other by a plurality of plates, said plates including:
         (a) a pair of end-plates each welded orthogonally against the adjacent ends of said parallel bars; and
         (b) a plurality of tensioning plates mounted between said bars.
      (2) a pair of braces diagonally joining the two bars between the upper end of the centrally located plates and the lower end of the other sets of pairs of plates; and
      (3) adjustable means for connecting said pair of lateral supports to the pair of end-plates.

2. The sawhorse of claim 1 wherein said tensioning plates comprises three sets of tensioning plates, two pairs being mounted face to face on each side of said bars about one sixth of the total length of said cross beam from its respective ends, and one pair being mounted in the center of said cross beam.

3. The sawhorse of claim 2 wherein said base member, post, buttresses, parallel bars and braces are made from various lengths of angle-iron.

4. The sawhorse of claim 3, wherein said adjustable means for connecting includes said pair of lateral supports and said pair of end-plates, having a series of matching holes coupled by bolts.

5. The sawhorse of claim 4, wherein said pair of lateral supports each further comprising a toe extending horizontally from the junction of said base member and post.

6. The sawhorse of claim 5, which further comprises: a pair of platforms adjustably secured to the upper end of the cross beam.

7. The sawhorse of claim 6 which further comprises:
a central footing mounted at the middle of said cross beam, under the central set of tensioning plates; and
a pair of shoulders diagonally joining the underside of cross beam next to the top of the central footing to the lower end of said post.

* * * * *